(12) United States Patent
Erny et al.

(10) Patent No.: US 8,833,036 B2
(45) Date of Patent: Sep. 16, 2014

(54) ALIGNING SHAFT DOORS OF AN ELEVATOR

(75) Inventors: Karl Erny, Holzhausern (CH); Hans Kocher, Udligenswil (CH)

(73) Assignee: Inventio AG, Hergiswil (CH)

( * ) Notice: Subject to any disclaimer, the term of this patent is extended or adjusted under 35 U.S.C. 154(b) by 243 days.

(21) Appl. No.: 13/553,251

(22) Filed: Jul. 19, 2012

(65) Prior Publication Data

US 2013/0025236 A1 Jan. 31, 2013

(30) Foreign Application Priority Data

Jul. 28, 2011 (EP) .................................... 11175843

(51) Int. Cl.
*E04G 21/18* (2006.01)
*B66B 19/00* (2006.01)
*B66B 13/30* (2006.01)

(52) U.S. Cl.
CPC ................. *B66B 13/30* (2013.01); *B66B 19/00* (2013.01)
USPC .............................. 52/745.15; 33/286; 33/645

(58) Field of Classification Search
USPC ........................... 52/745.15; 33/194, 286, 645
See application file for complete search history.

(56) References Cited

U.S. PATENT DOCUMENTS

| | | | |
|---|---|---|---|
| 4,819,403 | A | 4/1989 | Penicaut et al. |
| 5,479,754 | A | 1/1996 | Pelvilain et al. |

FOREIGN PATENT DOCUMENTS

CN 101537959 A 9/2009

*Primary Examiner* — William Gilbert
*Assistant Examiner* — Alp Akbasli
(74) *Attorney, Agent, or Firm* — Fraser Clemens Martin & Miller LLC; William J. Clemens

(57) ABSTRACT

A sill is aligned in the vertical direction on a laser line. The alignment of the sill in the horizontal direction is undertaken with a line set of an assembly jig. The line set includes at least two lines, for example a first line and a second line. The first line runs by a first run from the first part of the assembly jig to a third marking of the first line and from there by a second run to the second part of the assembly jig. If the lines are tightened and the marking is at one corner of the sill and the free end of the second line at the other corner of the sill, the sill is aligned in horizontal direction.

2 Claims, 5 Drawing Sheets

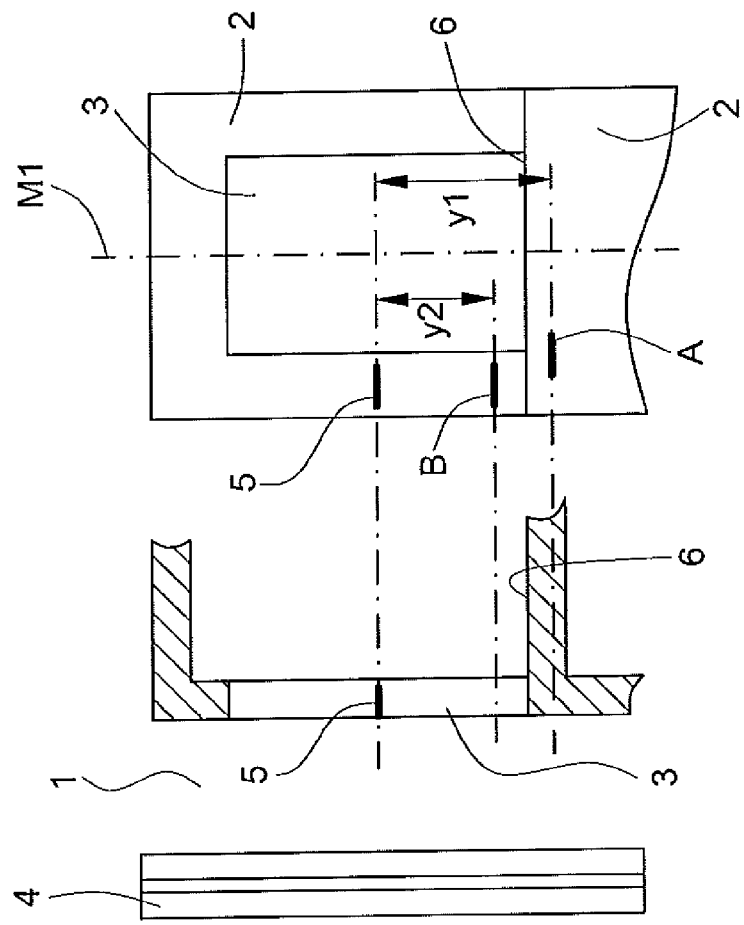

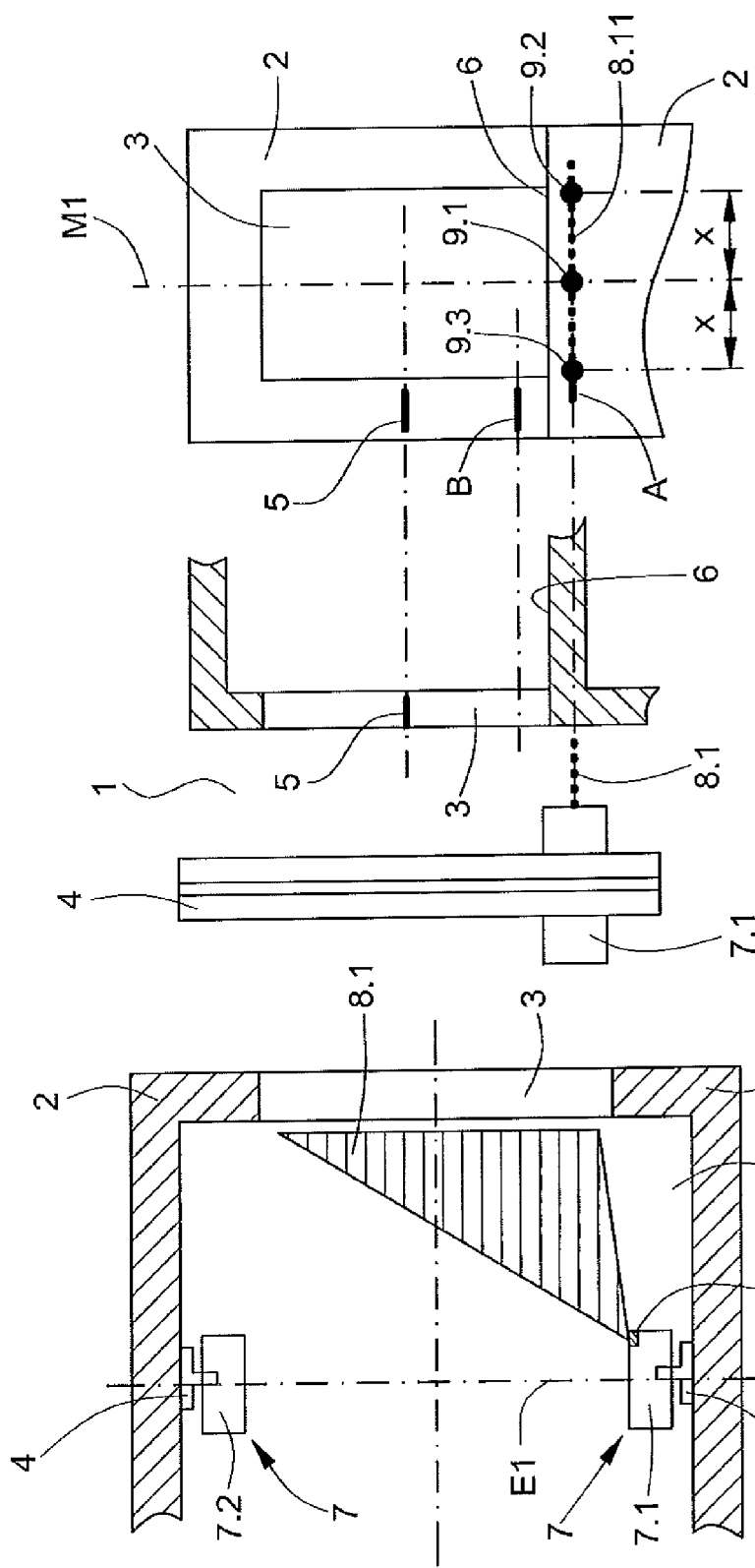

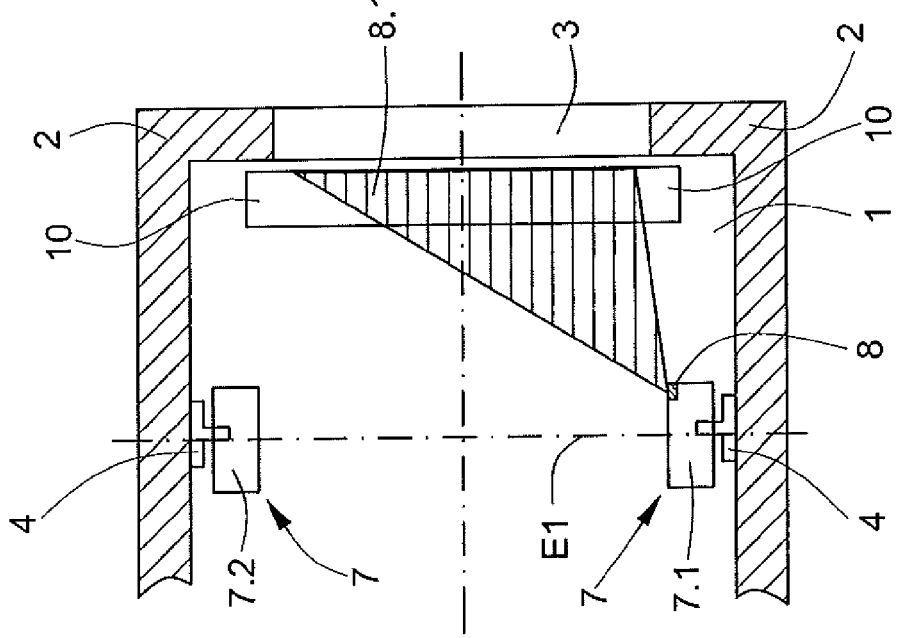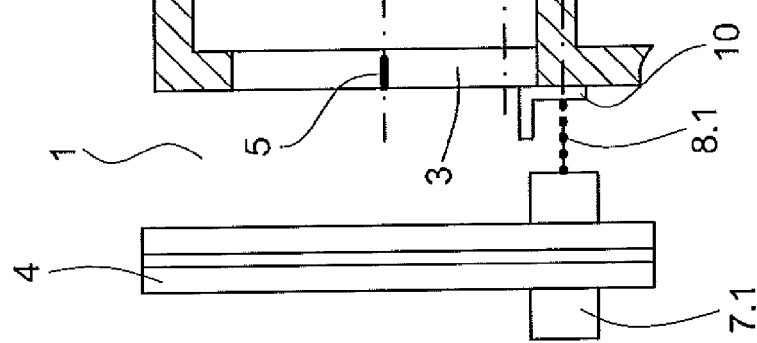

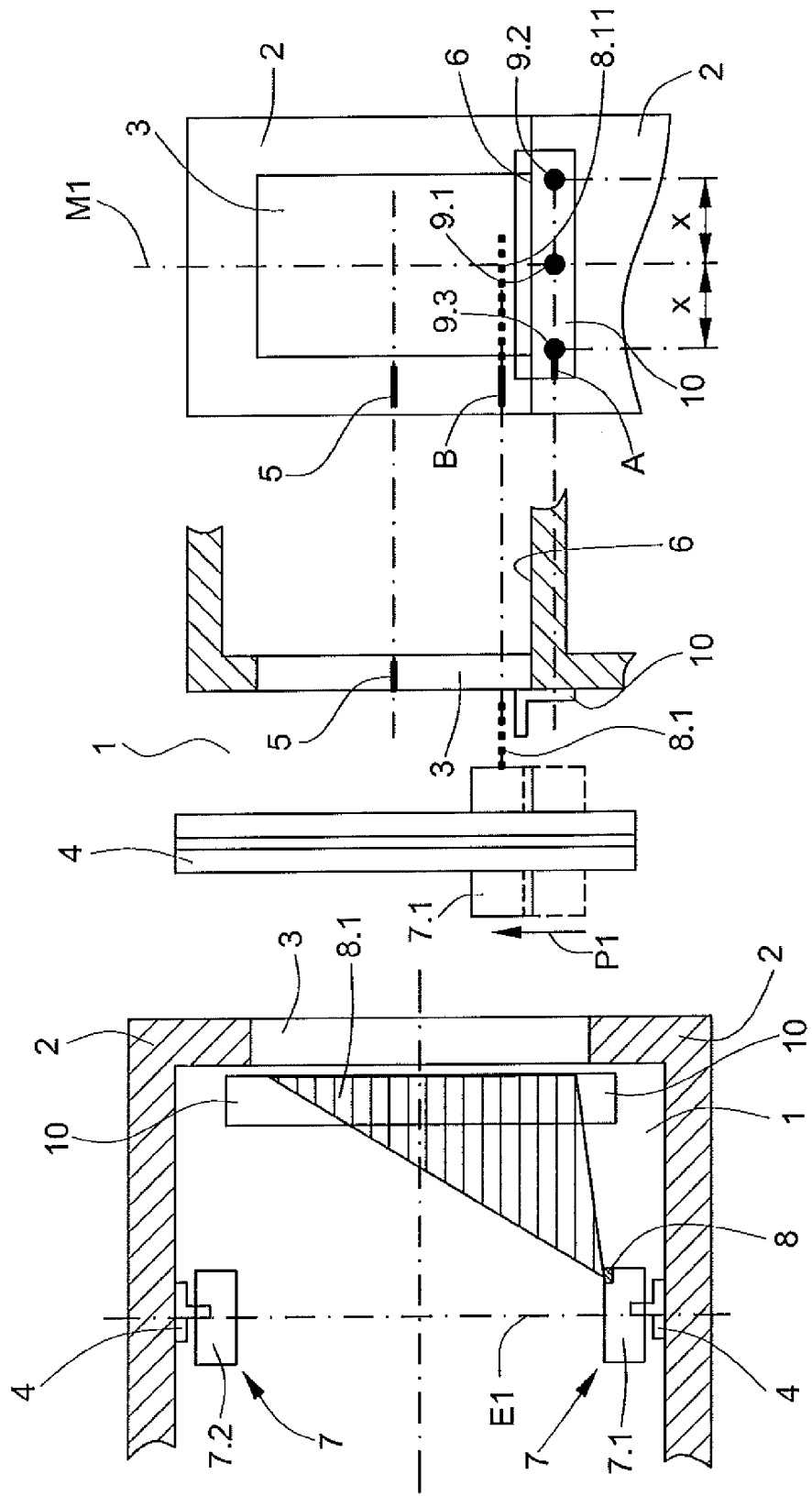

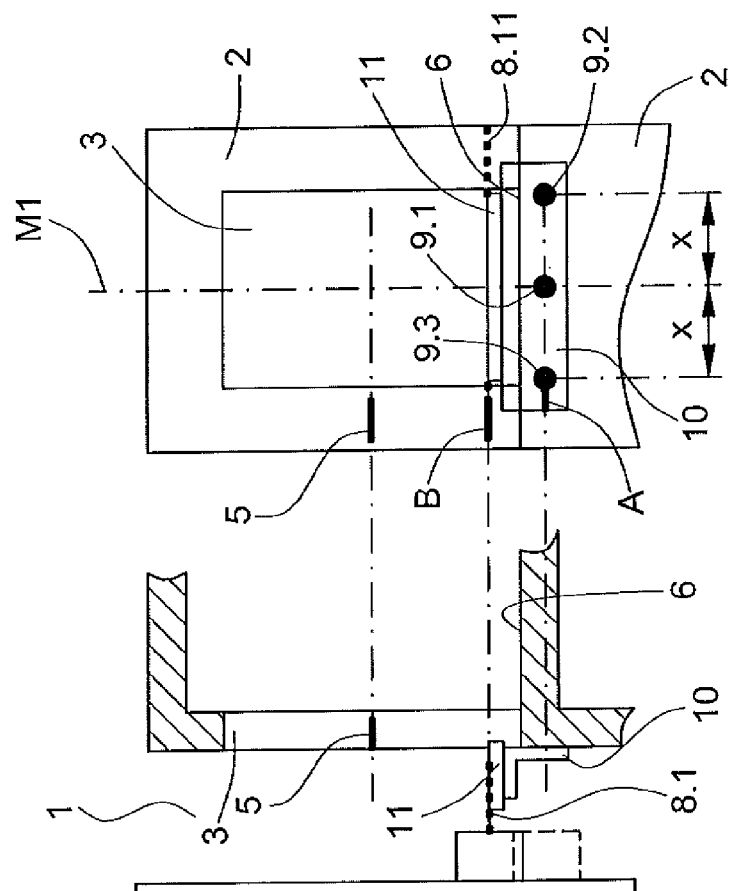
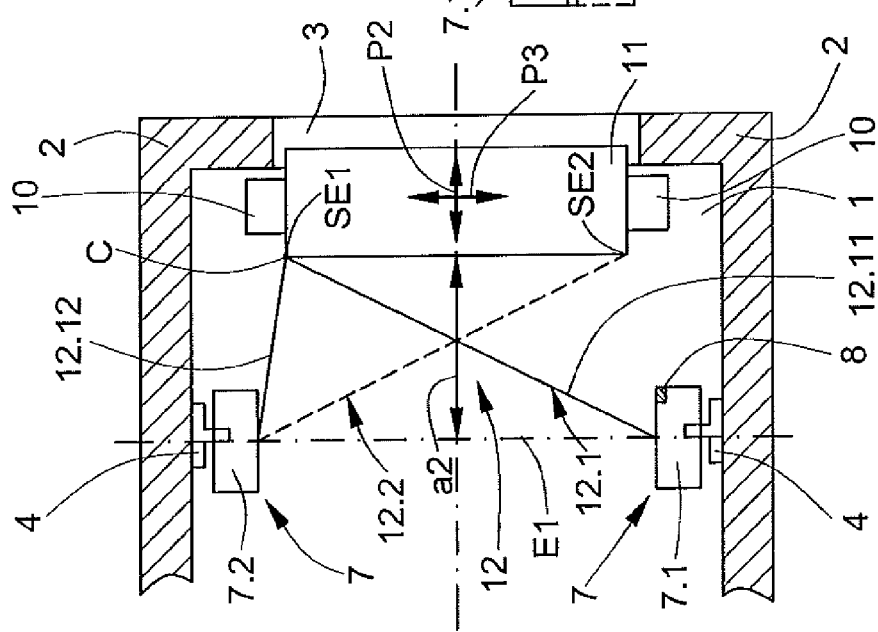

ALIGNING SHAFT DOORS OF AN ELEVATOR

CROSS-REFERENCE TO RELATED APPLICATION

This application claims priority to European Patent Application No. 11175843.9, filed Jul. 28, 2011, which is incorporated herein by reference.

FIELD

The disclosure relates to aligning shaft doors of an elevator.

BACKGROUND

Equipment for alignment of shaft doors of an elevator has become known from the specification CN 101537959 A. Guide rails for an elevator cage are mounted in an elevator shaft and aligned by a template. The template consists of a fork part which can be plugged onto one guide rail. Arranged at the fork part is a first part which determines the spacing between the guide rail and a door post of a mounted story door. Arranged on the door post side at the first part is a second part which determines the right-angle position of the first part relative to the door post. The template is of awkward construction and does not allow precise alignment of the guide rails.

SUMMARY

At least some of the disclosed embodiments enable precise alignment of shaft fittings with little effort.

The alignment of shaft fittings can be simplified by at least some of the disclosed embodiments. At least some embodiments are suitable for different shaft cross-sections and can simplify assembly operations in the elevator shaft. The equipment can be economic in production and easy to handle and can require little space (e.g., in the toolbox of the engineer).

At least some embodiments comprise an assembly jig which is mountable on guide rails and which consists of an electro-optical sighting instrument, such as, for example, a laser beam instrument, and of a line set.

In some embodiments, the shaft doors are aligned according to the aligned guide rails of the elevator cage. Before mounting of the guide rails the shaft door opening is determined with the smallest spacing in horizontal direction from the guide rails in plan view. If the smallest spacing is insufficient for passage of the elevator cage, the guide rails are mounted closer to the shaft wall opposite the door opening. After alignment of the guide rails in horizontal direction the shaft door opening with the smallest spacing can be furnished, as first shaft door opening, with a shaft door. Thereafter, the remaining shaft door openings are furnished with shaft doors, wherein compensation for a greater spacing in horizontal direction from the guide rails is provided by the door sill.

The height of the bores of the sill girder and the height of the door sill are measured from the meter mark or a reference height of the shaft door and marked on the shaft wall. The beam of the laser beam instrument arranged at the guide rail is thereafter aligned in horizontal direction with the height of the bores of the sill girder. The laser beam thus marks a horizontal line, which extends through the height mark of the bores of the sill girder, at the shaft wall. In addition, the center in vertical direction of all shaft door openings still has to be determined, for example by means of plumb bob. Starting from this center, the bore holes are determined on the laser line for the sill girder. After drilling of the holes the sill girder is mounted. The laser beam instrument is thereafter moved upwardly at the guide rail until the horizontal laser line runs through the height mark of the door sill. The door sill is then mounted on the sill girder and aligned in vertical direction in accordance with the laser line. The door sill is subsequently still checked and aligned in the horizontal plane and with respect to the guide rails by means of the cable set arranged at the fastening elements. The door posts are then plugged onto the sill girder and the door header onto the door posts. The door header is fixed to fastening brackets and aligned by means of the assembly jig analogously to the above explanation.

BRIEF DESCRIPTION OF THE DRAWINGS

The present disclosure is explained in more detail by way of example on the basis of the accompanying figures, in which:

FIG. 1 shows a plan view of an exemplifying elevator shaft,
FIG. 2 shows a side elevation of the elevator shaft,
FIG. 3 shows a view of a shaft door opening as seen from the elevator shaft,
FIG. 4, FIG. 5 and FIG. 6 show an embodiment of an assembly jig used in the elevator shaft,
FIG. 7, FIG. 8 and FIG. 9 show a sill girder placed by means of the assembly jig,
FIG. 10, FIG. 11 and FIG. 12 show preparatory measures for setting a sill and
FIG. 13, FIG. 14 and FIG. 15 show alignment of the sill.

DETAILED DESCRIPTION

FIG. 1 shows a plan view of an elevator shaft 1 which is formed at least partly by shaft walls or by constructions similar to shaft walls. At least one shaft wall 2 has, per story, a shaft door opening 3 through which an elevator cage 1.1 movable up and down in the elevator shaft 2 can be reached. The elevator cage 1.1 is guided along guide rails 4 arranged in the elevator shaft.

The guide rails 4 span, over the entire shaft height, a first plane E1 extending parallel to the shaft wall 2. Prior to mounting the guide rails 4, the shaft door opening with the smallest spacing a1 according to FIG. 1 from a first plane E1 of the guide rails of the plan view is determined. If the smallest spacing a1 is insufficient for passage of the elevator cage the guide rails 4 are mounted closer to the shaft wall opposite the door opening and aligned in the vertical direction. After alignment of the guide rails 4 the shaft door opening 3 with the smallest spacing a1 according to FIG. 1 can be furnished, as a first one, with a shaft door. The remaining shaft door openings of the elevator shaft 1 have, depending on the respective accuracy of the elevator shaft, a slightly larger spacing from the plane E1, wherein the difference from the smallest spacing a1 can be accommodated by alignment of the door sill of the respective shaft door. The spacing of the cage sill from the shaft door sill is thus the same for each story.

FIG. 2 shows a side elevation of the elevator shaft 1 with a meter mark 5 in the shaft door opening 3 and with a story floor 6 in bare construction. The meter mark 5 (bench mark) is a marking, which is usually applied after finishing of the basic build, at a door opening, in which, for example, a door frame or a story door is inserted. The meter mark 5 gives a height of a meter above the finished floor or the finished story floor 6 and is a reliable reference height for the participants in the construction such as, for example, floor layers, door constructors, elevator constructors, electricians, plasterers, etc.

FIG. 3 shows a view of the shaft door opening 3 as seen from the elevator shaft 1. A first marking A is provided at a first vertical spacing y1 from the meter mark 5 and a second marking B is provided at a second vertical spacing y2. The first marking A is a reference height for the drill holes for fastening a sill girder to the shaft wall 2 and the second marking B is a reference height for a door sill arranged at the sill girder. In addition, a center M1 in vertical direction of all shaft door openings 3 has to be determined by means of, for example, a plumb bob.

FIG. 4, FIG. 5 and FIG. 6 show an embodiment of a two-part assembly jig 7 used in the elevator shaft 1, wherein a first part 7.1 is provided at one guide rail 4 and a second part 7.2 at the other guide rail 4. A sighting instrument, for example an electro-optical sighting instrument such as, for example, a laser beam instrument 8, which generates a horizontal laser beam 8.1, is arranged at the first part 7.1. The laser beam instrument 8 can also be arranged at the second part 7.2. The first part 7.1 and the second part 7.2 of the assembly jig 7 are so arranged in vertical direction that the horizontal laser beam 8.1 hits the first marking A or is oriented to this and is visible on the shaft wall 2 as a horizontal laser line 8.11. The first drill hole 9.1 for fastening the sill girder is produced at the intersection of the center M1 of the shaft door opening 3 with the laser line 8.11, Further drill holes 9.2, 9.3 for fastening the sill girder to the shaft wall 2 are produced at a spacing x from the first drill hole 9.1.

FIG. 7, FIG. 8 and FIG. 9 show, by way of example, the sill girder 10 placed by means of the assembly jig. Bolts are placed in the drill holes 9.1, 9.2, 9.3 and the sill girder 10 is fixed at these. Instead of the drill holes 9.1, 9.2, 9.3 it is also possible to provide an embedded anchor rail with which the sill girder 10 can be screw-connected. After placing the sill girder 10, the spacings x from the center M1 of the shaft door opening 3 are re-measured and the position in vertical direction checked and, if necessary, aligned or corrected by means of the laser line 8.11.

FIG. 10, FIG. 11 and FIG. 12 show preparatory measures for placing a sill. The assembly jig 7 with the first part 7.1 and with the second part 7.2 is, as shown in FIG. 11 by a first arrow P1, pushed upwardly along the guide rail 4 until the horizontal laser beam 8.1 hits the second marking B or is aligned therewith and is visible at the shaft wall 2 as a horizontal laser line 8.11.

FIG. 13, FIG. 14 and FIG. 15 show the alignment of the sill 11 placed on the sill girder 10. The sill 11 is mounted on the aligned sill girder 10 and checked in vertical direction by the laser line 8.11. The alignment of the sill 11 in horizontal direction is symbolized by a second arrow P2 and by a third arrow P3 and is undertaken by a line set 12 of the assembly jig 7. The line set 12 consists of a first line 12.1 and a second line 12.2. For better understanding, the second line 12.2 is illustrated by a dashed line. The first line 12.1 runs by a first run 12.11 from the first part 7.1 of the assembly jig 7 up to a third marking C of the first line 12.1 and from there by a second run 12.2 up to the second part 7.2 of the assembly jig 7. The tightened first line 12.1 extends to the third marking C at a first corner SE1 of the sill 11. The second line 12.2 runs from the second part 7.2 and extends, in the tightened state, at the free end to a second corner SE2 of the sill 11. If the lines 12.1, 12.2 are tightened and the third marking C is at the first corner SE1 of the sill 11 and the free end of the second line 12.2 at the second corner SE2 of the sill 11, the sill 11 is aligned in horizontal direction. The length of the first run 12.11, the length of the second run 12.12 and the length of the second line 12.2 are predetermined by the position of the guide rails 4 in the elevator shaft 1, by the shaft dimensions, by the cage plan view and by the sill dimensions. The lengths of the runs 12.11, 12.12 and the length of the third line 12.2 can be calculated or prepared at the factory in accordance with the plan view of the elevator to be mounted or are determined by measurement taken at a pattern sill. As pattern sill use can be made, for example, of the sill of the above-mentioned first-mounted shaft door, wherein this shaft door in this case will have been aligned without the proposed assembly jig. The spacing a2 measured at right-angles to and from the sill 11 up to the plane E1 can be critical for the pattern sill.

A roller device for the first line 12.1 can be provided at the first part 7.1 and a roller device for the second line 12.2 can be provided at the second part 7.2, so that the lines 12.1, 12.2 can be unrolled for the alignment procedure and rolled up again after the alignment procedure.

In a further variant of embodiment the line set 12 can consist of three lines, in that the first line 12.1 is separated at the third marking C, By comparison with the above-illustrated line set, in the case of the three-line variant the second run 12.2 is by the separation of the first line 12.1 at the third marking C the third line. In this variant of embodiment each line has a fixed end and a free end at the first part 7.1 or at the second part 7.2. In handling and in use the three-line variant is comparable with the two-line variant explained above.

After placing and alignment of the sill 11 the door posts are plugged onto the sill girder 10 and a door header is plugged onto the door posts and the door header is fixed to brackets arranged above the shaft door opening 3. The door header serves as a support for, for example, guides and coupling devices and locking devices for the shaft doors. In analogous manner the door header has to be aligned relative to the sill 11. This can be carried out by the above-mentioned method steps and by the above-mentioned assembly jig.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. We therefore claim as our invention all that comes within the scope and spirit of these claims.

We claim:

1. An elevator installation method, comprising:
   determining a reference height for an elevator shaft door opening;
   applying a first marking at a first vertical spacing from the reference height;
   applying a second marking at a second vertical spacing from the reference height;
   mounting an assembly jig at guide rails arranged in an elevator shaft using an electro-optical sighting instrument;
   orienting a horizontal beam of the sighting instrument to the first and second markings;
   vertically aligning shaft door parts according to the horizontal beam; and
   horizontally aligning the shaft door parts using a line set of the assembly jig.

2. The elevator installation method of claim 1, the shaft door parts being horizontally aligned using at least two lines of the line set.

* * * * *